P. BARNES.
CAR FOR MONORAILWAYS.
APPLICATION FILED AUG. 10, 1911.
1,044,727.
Patented Nov. 19, 1912.
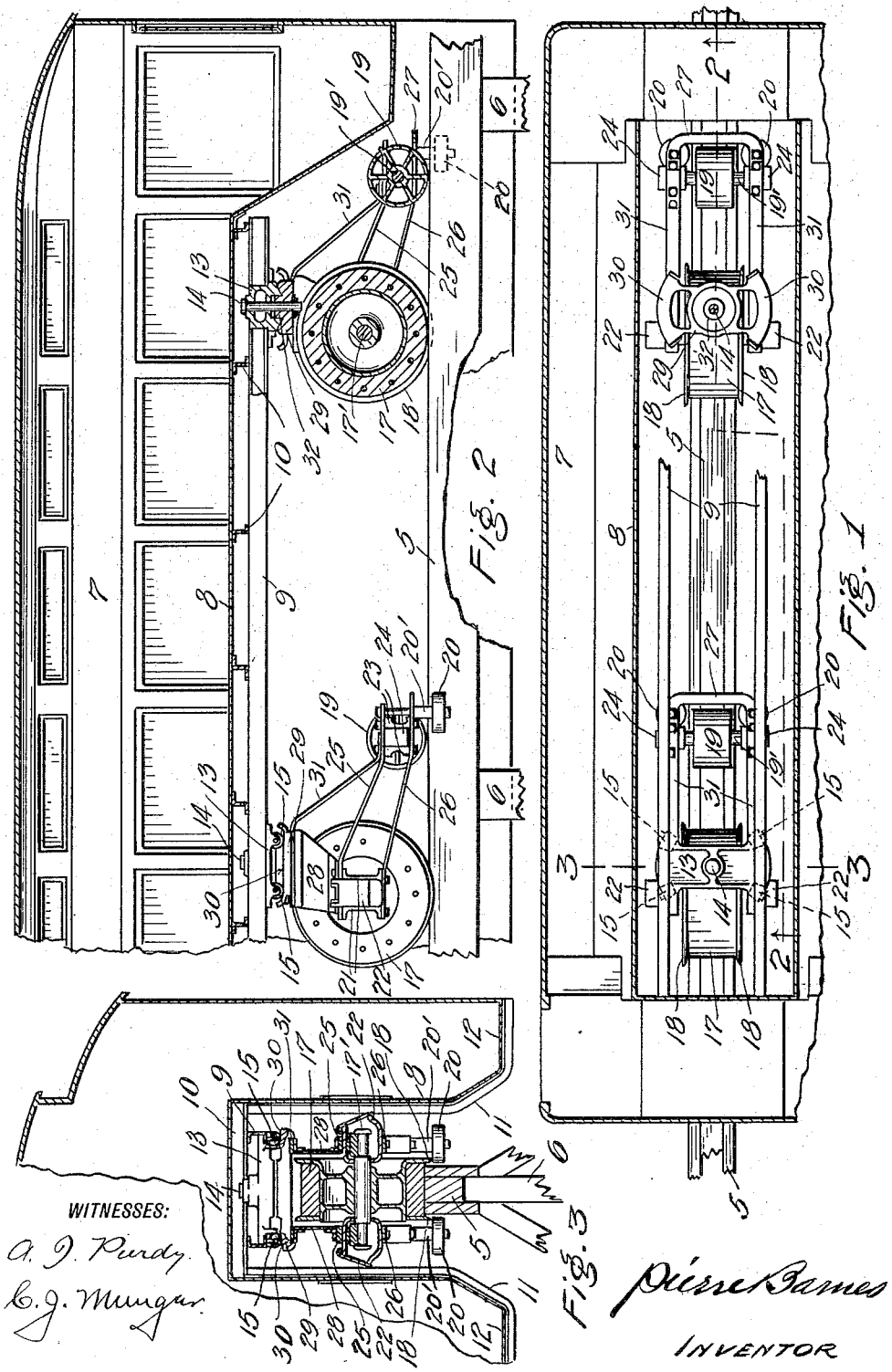

UNITED STATES PATENT OFFICE.

PIERRE BARNES, OF SEATTLE, WASHINGTON.

CAR FOR MONORAILWAYS.

1,044,727.　　　　Specification of Letters Patent.　　Patented Nov. 19, 1912.

Application filed August 10, 1911. Serial No. 643,465.

*To all whom it may concern:*

Be it known that I, PIERRE BARNES, a citizen of the United States, residing at Seattle, in the county of King and State of Washington, have invented certain new and useful Improvements in Cars for Monorailways, of which the following is a specification.

This invention relates to cars designed for use on elevated monorailways.

The object of the present invention is the perfecting in such cars and, more particularly, to improve the trucks therefor and the manner in which the same are connected with a car body.

The invention consists in the novel construction and adaptation of devices which will be hereinafter described with reference to the accompanying drawings, wherein—

Figure 1 is a horizontal section showing a portion of a monorail car embodying my invention. Fig. 2 is a longitudinal vertical section taken through 2—2 of Fig. 1. Fig. 3 is a transverse vertical section on 3—3 of Fig. 1.

The reference numeral 5 designates a track rail desirably constructed of wood, and is suitably supported as by posts 6. The car body 7 is formed with a centrally disposed trunk 8 extending longitudinally of the car for the accommodation of the trucks and of the track-rail 5. Said trunk is secured to, or made a part of, the underframing of the car. As illustrated, this underframing comprises two longitudinal beams 9 carrying horizontal transverse bars 10 and from the ends of the latter depend frame members 11 which extend down to and under the car floor 12 at opposite sides of the track.

Adjacent to their ends, the beams 9 are connected to body bolsters 13 which are provided at their centers with sockets for king bolts 14 and near their outer ends are desirably provided with apertured lugs to serve as journal bearings for the axles of rollers 15. Each of the trucks is provided with a relatively large car wheel 17 provided with side flanges 18 which serve to prevent a wheel from being displaced from the track in either lateral direction. In advance, desirably, of such wheel, each truck is provided with a pivot wheel 19 which, in the present disclosure, is illustrated as being unprovided with flanges. A truck also is provided with a pair of guide wheels 20 disposed to rotate on vertical spindles 20′ and, upon occasion, track against the opposite sides of the rail 5. These guide wheels are disposed at distances apart to afford a small space between their peripheries and the rail when the associated wheel 17 is traveling centrally of the track and upon a straight portion thereof. A truck-frame is provided with columns 21 between which are the boxes 22 for the journals of the axle 17′ of the wheel 17. 23 are the columns of the boxes 24 for the axle 19′ of the pilot wheel. Upper and lower side bars 25 and 26, respectively, connect the columns 21 and 23, and 27 is an end piece connecting the side bars 26 to furnish strength and rigidity to the truck-frame sufficient to withstand lateral strains derived from the forces encountered by the guide wheels 20 when engaged with the track-rail.

28 indicate pedestals secured to the bars 25 above the columns 21 to support the ends of a truck-bolster 29. Centrally of the truck-bolster is a socket for the king-bolt 14 and a turret 32 on the truck bolster is provided to fit into a recess provided in the underside of the companion body-bolster. The truck-bolsters are provided with side bearings 30 upon which the rollers 15 are supported.

31 represent tie-bars extending from the top of the pedestals 28 to the bars 25 in proximity to the pilot wheel of each truck.

The axis of the king bolt, or the swivel connection of the truck, is located between the axes of the wheels 17 and 19 thereof, but is positioned closer to that of the wheel 17 in order that a load placed on a truck is borne principally by the wheel 17 and with only sufficient weight applied to the other wheel 19 to insure the same tracking on the rail. By thus subjecting a pilot-wheel to a relatively light load the resistance to lateral movement will be correspondingly small and thus a truck is easily influenced by the wheels 20 to serve the wheel 19 upon entering or leaving a curved portion of a track.

The side bearings, provided in the illustrated embodiment with anti-friction rollers 15, tend to maintain the body bolster and car structure connected therewith against side tilting with respect to the trucks.

The operation of the invention will, it is thought, be understood from the foregoing description.

What I claim, is—

1. The combination with a monorail, and a car body, of a car truck therefor comprising a frame carrying a car wheel and a pilot wheel which track on the top surface of said monorail, a pair of guide wheels disposed in proximity to the pilot wheel and arranged to track against the opposite sides of the monorail, and a swivel connection for the truck frame disposed relatively close to the car wheel whereby the truck is adapted to turn on a vertical axis at a closer distance from the axis of rotation of the car wheel than from the axis of rotation of said pilot wheel.

2. The combination with a monorail, of a truck provided with a flanged wheel arranged to travel on the monorail, guide wheels carried by the truck and adapted to track against the opposite sides of the monorail for regulating the direction of travel of the flanged wheel, and a supplementary wheel arranged to travel on the monorail and serving to support said guide wheels.

3. The combination of a monorail, and the frame of a car, a truck frame connected with said frame for rotary movement about a vertical axis, two traction wheels for the truck frame, and a single pair of guide wheels engageable with the sides of said monorail whereby the turning of the truck about the aforesaid axis is controlled.

PIERRE BARNES.

Witnesses:
H. BARNES,
E. PETERSON.

---

Copies of this patent may be obtained for five cents each, by addressing the "Commissioner of Patents, Washington, D. C."